Dec. 3, 1968 L. F. MILLER 3,414,641

METHOD OF FABRICATING RESISTOR COMPOSITIONS

Filed July 30, 1965 3 Sheets-Sheet 1

INVENTOR.
LEWIS F. MILLER

BY Wolmar J. Stoffel
ATTORNEY

Dec. 3, 1968 L. F. MILLER 3,414,641
METHOD OF FABRICATING RESISTOR COMPOSITIONS
Filed July 30, 1965 3 Sheets-Sheet 3

United States Patent Office 3,414,641
Patented Dec. 3, 1968

3,414,641

METHOD OF FABRICATING RESISTOR COMPOSITIONS

Lewis F. Miller, Wappingers Falls, N.Y., assignor to International Business Machines Corporation, Armonk, N.Y., a corporation of New York Filed July 30, 1965, Ser. No. 475,985
5 Claims. (Cl. 264—40)

ABSTRACT OF THE DISCLOSURE

A method for controlling electrical properties, such as resistance and temperature coefficient of resistance, of a resistor paste by correlating such properties with the number of passes to which the composition is subjected on a roll mill. Once the correlation is established, the electrical properties of a particular composition may be predicted from the number of passes of such a composition on the roll mill.

This invention relates to electrical resistors, more particularly to methods of fabricating electrical resistor compositions for producing glazed electrical resistors in microminiaturized circuits, and still more specifically to methods for fabricating resistor compositions, wherein the milling parameter is utilized to accurately control the electrical resistance and/or temperature coefficient of resistance and/or drift characteristics of resistors produced from the resultant milled resistor compositions.

In modern electrical apparatus, particularly computer apparatus and the like, there is an ever increasing use of microelectronic circuit techniques. Typical of such recent technique developments is the microminiaturized circuit module. The circuit module is typically a one-half inch square of ceramic, a fraction of an inch in thickness, having functional components mounted thereon which are electrically connected with printed wiring. The functional components are active and passive electric circuit elements capable of performing useful functions or operations. Passive devices such as resistors are normally applied to the substrate by printing techniques and subsequently fired to fuse and solidify the resistance composition.

The known resistor compositions used to print resistors on substrates and the like, particularly module substrates, are not entirely satisfactory. It is desirable to initially print resistors to the proper dimensions to achieve the desired resistance values. However, with known resistor compositions, it is generally not possible to do this when relatively close tolerances of electrical properties of the resistors must be maintained. In general, the electrical resistance properties of the known resistor compositions cannot be predicted accurately, particularly compositions from different batches. Further, variations in the firing cycles may cause relatively large variations of the electrical resistance and temperature coefficient of resistances of the fired resistors produced from known resistor compositions produced in accordance with presently known techniques. These effects account for relatively unpredictable electrical properties and electrical values of fired resistances printed with resistor compositions produced in accordance with known techniques.

General practice is to print and fire a resistor that is slightly oversize, and then trim it to the desired electrical resistance value. This expedient has its shortcomings since it entails an extra very exacting process step which materially increases the cost of the printed circuit. Further, as the resistors become increasingly more miniaturized, the expedient becomes more difficult in practice. In addition to the decreased size of the resistor making it a more exacting operation, it also becomes more critical in what increments the resistor is removed. A relatively small chip of the resistor upon removal may cause an increase in electrical resistance which places the resistor outside the set tolerance limits. Normally, the entire module must be then discarded.

It is an object of this invention to provide a new method of producing printed resistors.

It is another object of this invention to provide a new method of fabricating resistor compositions.

Yet another object of this invention is to provide a new method of fabricating resistance compositions in which the electrical properties of the resultant composition can be accurately predicted and controlled by milling.

Another object of this invention is to provide a new method of fabricating resistor compositions wherein the electrical resistance of a fired resistor produced therefrom can be accurately controlled and predicted.

Yet another object of this invention is to provide a new method of fabricating a resistor composition in which the temperature coefficient of resistance of fired resistors produced thereform can be accurately controlled and predicted during the fabricating stage.

Another object of this invention is to provide a method of producing or conditioning resistor compositions in which the milling parameter is used to accurately predict and control the ultimate electrical resistance and/or temperature coefficient of resistance and/or drift characteristics of the fired resistors produced from the composition.

Yet another object of this invention is to provide a new method of conditioning a resistor paste to predictably impart optimum electrical resistance and temperature coefficient of resistance properties to same.

These and other objects are accomplished in accordance with the broad aspects of the present invention by providing a method of conditioning resistor paste formed of a solids mixture and an inert liquid vehicle. In the method of conditioning of my invention, a sample portion of a raw paste is subjected to a multiplicity of passes through a roll mill having the rollers thereof biased together in operative milling engagement. Periodically during the milling of the sample portion of paste, portions thereof are removed and used to form printed resistors which are subsequently fired. The electrical properties of the resistors are measured and a correlation prepared setting forth the relationship between the electrical properties of the milled paste and the number of passes through the rolling mill. The correlation is then used to determine the number of passes through the rolling mill which are necessary to condition the paste composition to achieve the electrical properties desired. The paste is then milled the indicated number of passes.

The new method of preparing resistor compositions of my invention solves many of the problems prevalent to producing electrical resistors and resistor compositions therefor known to the prior art. The new method of my invention, utilizing the discovery that the resistance and related properties of resistor compositions can be controlled by the degree of milling, makes the production of resistor compositions and resistors to within very close tolerances a practical reality. Moreover, a given resistor paste of a given component percent can be used to reliably produce a number of dissimilar resistor compositions each having quite dissimilar electrical properties. Since the electrical properties of the resistor composition conditioned by the method of my invention can be accurately predicted, the printing and firing of electrical resistors to produce resistors of close tolerances often eliminates the necessity of trimming. Still further, drift and temperature coefficient of resistance properties of compositions milled in accordance with my new method can be accurately predicted and optimized.

The foregoing and other objects, features, and advantages of the invention will be apparent from the following more particular description of preferred embodiments of the invention as illustrated in the accompanying drawings.

Figure 1:
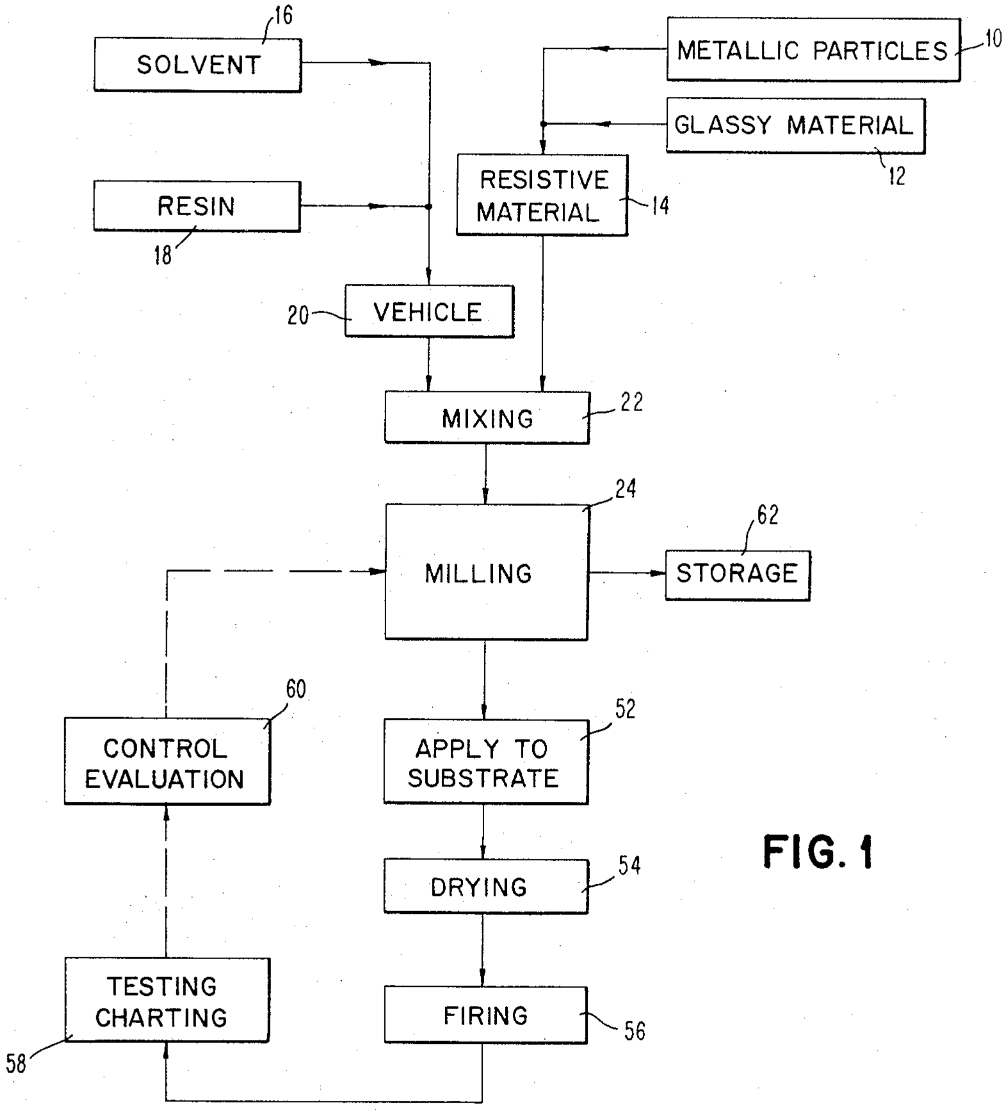
FIG. 1 is a flow diagram of the process for preparing and conditioning a resistor composition of the invention.

Referring now to FIG. 1 of the drawings, which depicts a flow chart of the method of the invention, there is indicated metallic particles 10 and a glassy material 12, or the like, are combined to form the resistive material 14, frequently referred to as the pigment. The metallic particles can be any suitable metal, or metal oxide, or combination of metals and/or oxides including dopants in any suitable proportion. The particle size of the pigment is preferably in the range of from 1–50 microns in diameter. The glassy material 12 can be present in the material 14 in any suitable concentration, more preferably constituting 50–70% by weight of the resistive material. The glassy material can be any suitable type of material such as finely divided glass frit, silicon dioxide, aluminum oxide, and the like or mixtures thereof. The various components of the resistive material should be thoroughly mixed in a suitable mixer.

A solvent 16 and a resin 18 are combined preferably with a surfactant to produce a vehicle 20. The resin component of the vehicle in combination with the solvent will provide the resistor composition with the desired flow characteristics. The resin and solvent should be compatible, that is, the resin should dissolve in the solvent. Frequently, it is preferable to also include a surfactant, which is a surface active additive, which is used to wet the pigment particles to give good dispersion, reduce settling, and promote screenability. A proper selection of the solvent, resin, and surfactant, selected in conjunction with the type of pigment and relative proportions of each, should result in a resistor composition that is generally suitable for the particular application desired. If the composition is to be employed in silk screening techniques, it must be sufficiently fluid to allow it to be screened, but it must also be sufficiently firm after being printed to maintain the desired physical dimensions.

As indicated in FIG. 1, the vehicle 20 and resistive material 14 are subjected to a mixing operation 22. The relative proportion of vehicle 20 and resistive material 14 can be any suitable ratio to achieve the desired resistor composition characteristics. More preferably, the resultant resistor paste will constitute from 50–83% by weight of the resistive material 14, and 17–50% by weight of the vehicle 20.

Figure 2:
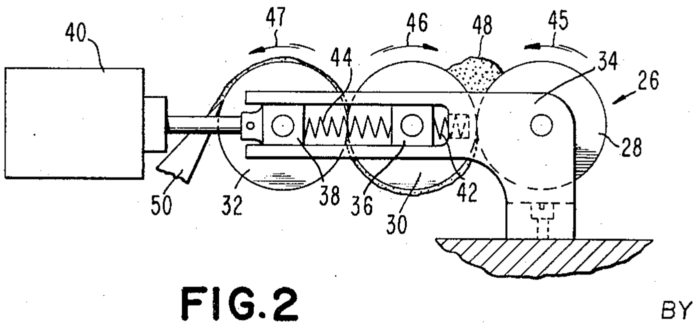
FIG. 2 is a side elevational view of a typical roll mill used in the practice of the method of preparing and conditioning a resistor composition of the invention.

The resultant resistor paste is then subjected to a milling operation 24, preferably in a three roll mill 26, shown in FIG. 2 of the drawings. The roll mill 26 has three rollers 28, 30, and 32 rotatably mounted on support 34. Roller 28 is mounted on support 34, while rollers 30 and 32 are mounted in blocks 36 and 38 respectively, which are biased toward roller 28 by air cylinder 40. Springs 42 and 44 bias the rollers apart in opposition to cylinder 40. This biasing force is overcome by cylinder 40. The direction of rotation of rollers 28, 30 and 32 are indicated by arrows 45, 46 and 47 respectively. The angular velocity of roller 30 is twice that of roller 28, and the angular velocity of roller 32 is twice that of roller 30. In use, resistor paste 48 is deposited between rollers 28 and 30. As the rollers are rotated, a portion of the paste 48 passes between the rollers 28 and 30 and is milled to a smaller particle size. The paste adheres to the respective rollers. However, since roller 30 is rotating at a higher angular velocity than roller 28, more paste is delivered to the rolling contact area between rollers 32 and 30 than is delivered back to the build up of paste 48. The paste adhering to roller 30 is then passed between rollers 30 and 32. A smaller portion of the paste is returned by roller 32 to the build up of paste 48 than is delivered to scoop 50 by roller 32 because of the relative angular velocity of the rollers. Passage of the paste from the build-up area between rollers 28 and 30 to the scoop 50 is considered one pass through the roll mill.

A portion of the resistor paste is subjected to a milling operation 24, as the first step of a milling control feedback evaluation. The paste portion is subjected to a multiplicity of passes through the roll mill 26, and periodically samples of the resultant paste removed. For example, samples of the milled paste portion can be removed after five, ten, fifteen, and twenty milling passes. The samples thus removed are then applied to a suitable substrate, as indicated by block 52 in the flow diagram of FIG. 1. The application of the paste to a substrate is preferably done by silk screening techniques, in which the respective resistors formed are equal sizes and thicknesses. The substrate is most desirably a ceramic wafer or other stable and inert material which will not melt, burn, sublimate, etc., when heated. The screened resistors are then subjected to a drying operation 54 and a standard firing operation 56. The electrical and/or related physical characteristics of the fired resistors are then tested and evaluated, and the results charted, and indicated by block 58 on FIG. 1.

It has been discovered that electrical and various physical properties of resistor compositions can be very radically influenced by the type of and degree of milling. This is quite unexpected since it was previously believed that resistor compositions could be significantly varied only by altering the type of ingredients and proportions thereof. I have discovered that the milling of resistor pastes and compositions very materially alter such characteristics as resistivity, temperature coefficient of resistance (hereafter referred to as TCR), frequency dependence, high temperature and power drift, and other related properties. Further, the effect of the milling parameter can be accurately evaluated and controlled by the method of the invention. The method of the invention can be used to optimize various electrical and physical properties, strike a compromise balance between a number of characteristics or properties, or achieve a specific value, or range of values of a single property or characteristic in a given resistance composition. The method can also be used to experimentally select the relative proportions of composition components to achieve a specific set of electrical properties. This can be done by inspection of a curve and varying the compositions from a consideration of the curve.

After a chart, or other correlation has been prepared, it is consulted to evaluate or determine the number of passes that the remaining resistor paste must be subjected to in order to obtain in it the desired electrical properties. This process step is indicated by block 60 on FIG. 1. The remaining paste is then conditioned to the indicated number of passes, and the resultant milled resistance composition is placed in storage 62 or used.

When it is desired to obtain a very precise control of resistor composition properties, the paste is milled a number of passes slightly less than the actual number in the control evaluation step 60. Then a sample is taken, applied to a substrate, dried, fired, and tested to determine the magnitude of the property of interest. The chart, or correlation, can then be used to determine very precisely the additional number of passes necessary to further condition the resistor paste to the desired condition.

A preferred embodiment of the conditioning method of the invention is milling resistor paste to achieve a specific value of resistivity of resistors produced therefrom. In this embodiment a correlation, preferably a graph, is made by testing fired resistors and plotting resistance versus number of passes. The graph is then used to deterimne the required number of passes through the roll mill that the paste must be subjected to achieve the desired resistivity value in the resistor paste.

Another preferred embodiment of the conditioning method of the invention is milling resistor paste to achieve a specific value of TCR. In most instances a TCR of zero is most desirable. In using the graph prepared in the testing and charting step, the appropriate number of passes necessary to condition the paste to zero TCR can be determined by noting where the curve crosses the zero TCR value. In some instances, where the curve does not cross the zero value of TCR, the most optimum number of passes can be determined to give the lowest and most optimum value.

The method can also be utilized to strike an optimum balance by plotting a number of variables, such as resistance, TCR, drift, etc., and noting the most desirable compromise which can be achieved. The appropriate number of passes to achieve this compromise can then be evaluated and utilized to condition the resistor paste.

In the practice of my conditioning method, the testing and charting step need to be done once only for a given type of paste. For example, the charting need be done only once for a given lot of paste. Subsequent batches of the paste, if the production steps and relative proportions of ingredients are the same, can be evaluated from a chart prepared previously. The method can also be used to condition resistor pastes which are commercially available and which component ingredients are unknown.

The following examples are included merely to aid in the understanding of the invention, and variations may be made by one skilled in the art without departing from the spirit of the invention.

Example 1

An electrically conductive pigment was prepared from the following:

| | Parts by weight |
|---|---|
| Silver | 18 |
| Palladium oxide | 22 |
| Glass | 60 |

The palladium, which was purchased from a commercial vendor, was combined with nitric acid ($HNO_3$—70% concentrated) at a ratio of 10 grams of palladium per 100 mm. of nitric acid. The acidity of the resultant palladium nitrate solution was then reduced to a pH of one with a mixture of concentrated high purity reagent quality ammonium hydroxide ($NH_4OH$—28% concentrated) and 4% silicone antifoam agent, (e.g. a silicon dispersant sold by Dow Corning, Midland, Mich. as Silicone Antifoam B). A reducing solution consisting of 32% hydrazine ($N_2H_4$) and 64% water was prepared. The palladium nitrate solution was then heated to 100° C. and the reducing solution added at a rate of 1 cc. per 15 seconds. The completion of the reducing reaction was indicated by the disappearance of color from the solution. Boiling was maintained during the reduction and for approximately 5 minutes thereafter. The reduced palladium metal was dried at 105° C. for one hour. The resultant palladium metal had a surface area of approximately 14 m.$^2$/gm. The reduced palladium was then put in a belt oven where it was exposed to a thirty minute "soak" period, a heating period of sixty minutes at 800° C. and a "out" period of thirty minutes. The palladium was thereby oxidized to palladium oxide which had a surface area of 13 m.$^2$/gm. The palladium oxide was then combined with the silver and glass. This method of producing electrically conductive material is described and claimed in commonly assigned U.S. patent application Ser. No. 388,459, filed Aug. 10, 1964, now U.S. Patent No. 3,345,158.

The glass in the pigment was composed of:

| | Percent by weight |
|---|---|
| $SiO_2$ | 29 |
| $PbO_2$ | 51 |
| $B_2O_3$ | 9 |
| $Al_2O_3$ | 3.2 |
| $TiO_2$ | 2 |
| $ZrO_2$ | 3.1 |
| $Na_2O$ | 1.7 |
| CdO | 3.0 |

The pigment formulation was shaken together in a sealed container for 120 minutes.

A vehicle for the resistor paste was made up of the following constituents:

| | Parts by weight |
|---|---|
| Aromatic solvent (Amsco-Solv HCC) | 57 |
| Polystyrene resin (Piccolastic D–100) | 37 |
| Nonyl phenoxy polyoxyethylene ethanol surfactant | 6 |

Amsco-Solv HCC is an aromatic naphthenic hydrocarbon mixture which is a distillation cut from a crude petroleum having the following properties.

| | |
|---|---|
| Distillation, ° F.: | |
| IBP | 450 |
| 5% | 470 |
| 10% | 477 |
| 20% | 483 |
| 30% | 487 |
| 40% | 492 |
| 50% | 499 |
| 60% | 505 |
| 70% | 514 |
| 80% | 525 |
| 90% | 543 |
| 95% | 558 |
| ASTM End Point | 588 |
| Specific gravity at 60° F. | .9285 |
| Aromatics, percent | 65 |
| Boiling Point Range, ° F. | 450–588 |

Piccolastic D–100 is a polystyrene resin having a molecular configuration

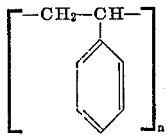

having the following characteristics:

| | |
|---|---|
| Melting point, ball and ring (100), ° C. | 0 |
| Color, Gardner | 3–6 |
| Estimated molecular weight | 1500 |
| Acid number | <1.0 |

These ingredients were agitated in a closed high kinetic energy disperser unit until all of the polystyrene was dissolved.

Eighty parts by weight of the premixed silver-palladium-glass pigment were combined with the 20 parts by weight of the vehicle and mixed in an electric mortar for approximately fifteen minutes until completely wetted.

Figure 3:
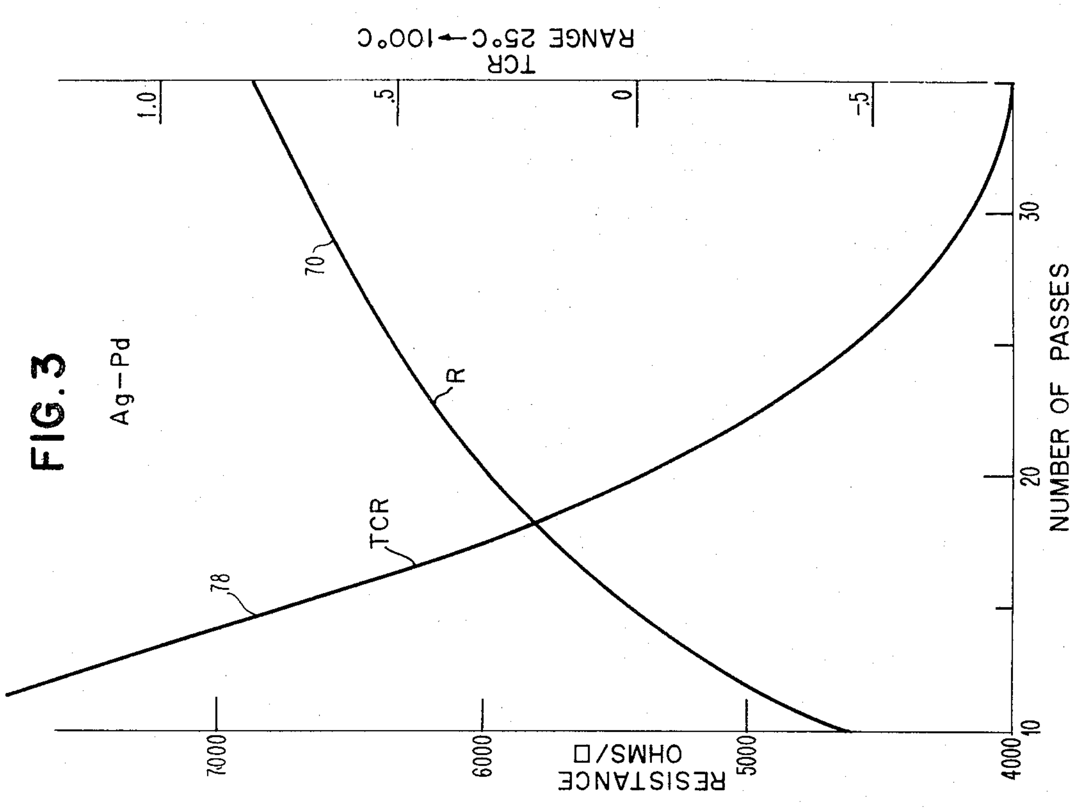
FIG. 3 is a graph having a first curve of resistance in ohms per square versus number of passes, and a second curve of temperature coefficient of resistance versus number of passes, which graph presents experimental data described in Example 1.

The resultant resistor paste was then passed through a three roll mill with 2½ inch diameter rolls which had been modified by replacing the head screw pressure settings with three inch pneumatic cylinders and air pressure gauges. The roll temperatures were made uniform by circulating water at 20° C.±2° C. at a constant rate. During the milling operation the air pressure in the pneumatic cylinders as indicated by the air pressure gauges was maintained at 30 pounds per square inch. The paste was passed through the rolling mill a total of 35 passes. While the paste was being milled samples were taken periodically at the end of approximately each five passes. Each sample was then used to print a resistor with a pattern that was .065 inch by .040 inch in a .050 inch electrode gap. The thicknesses of the resistors were approximately .001 inch. After printing the resistors were dried in a furnace at 100° C. for ten minutes and then fired in a furnace maintained at 760° C. for a period of ten minutes. After the resistors were cooled to room temperature, the electrical resistance of each sample was measured and a resistance per square calculated. The results were then used to prepare curve 70 with resistance per square on the ordinate and number of passes on the abscissa. This curve 70 of the results is depicted in FIG. 3 of the drawing. Inspection of the graph produced with the data gathered in the example indicates that there is a definite nonlinear relationship between the number of passes that the resistor composition is subjected to, and the resistance of resistors produced from the paste.

The graph can be used to practice the method of conditioning resistor paste of the invention. The same basic procedure was used to prepare a plot of TCR versus number of passes. By placing both resistance and TCR on the same graph, a compromise number of milling passes can be selected if both values must be considered.

Example 2

A resistor composition was prepared having the identical weight of ratios of silver, palladium and glass present in the resistor composition described in Example 1. The resistor composition differed from that described in Example 1 only in the palladium oxide particle size. The surface area of the palladium oxide, which is directly related to particle size, was of the order of 7.6 m.²/gm. The palladium oxide in the mixture was prepared by dissolving palladium in a nitric acid solution containing one part by weight of silicon dispersant. The resultant palladium nitrate solution was then reduced with a reducing solution composed of the following:

| | Parts by weight |
|---|---|
| Hydrazine ($N_2H_4$) | 32 |
| $H_2O$ | 66 |

Figure 4:
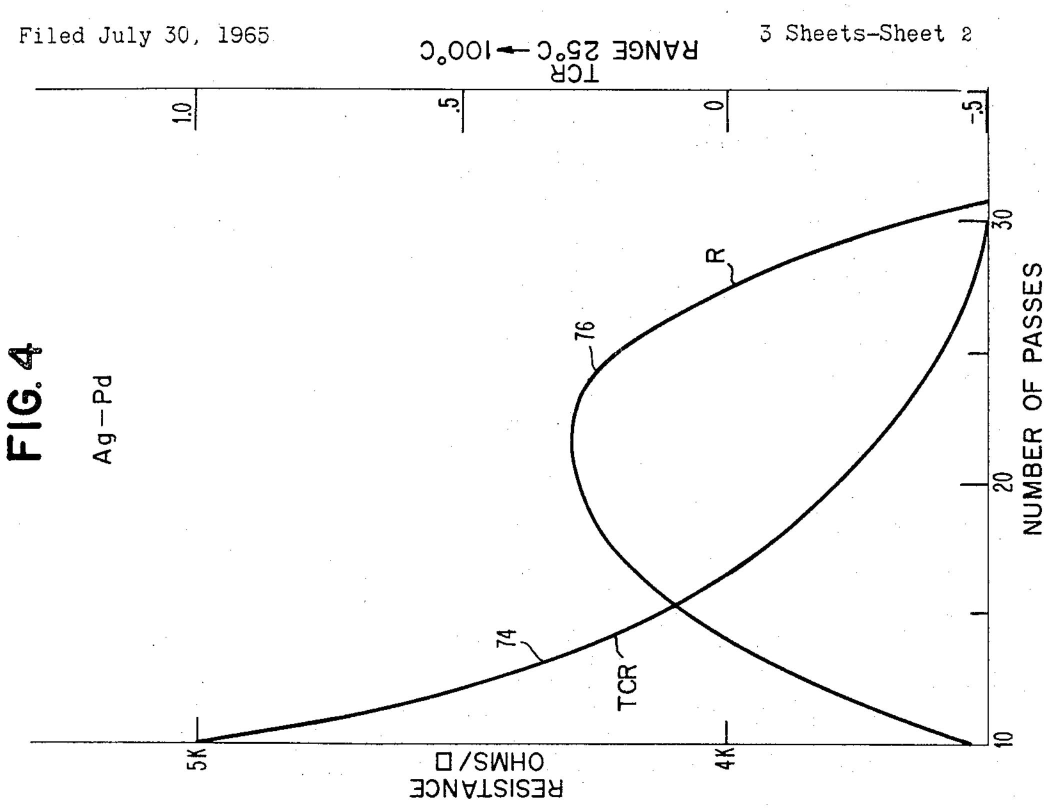
FIG. 4 is a graph showing a first curve of resistance versus number of passes, and a second curve showing temperature coefficient of resistance versus number of passes, which presents data described in Example 2.

The pallidum nitrate solution was heated to boiling and the above reducing solution added at the rate of 1 cc. per 15 seconds until the completion of the reducing reaction indicated by the disappearance of color from the solution. The palladium having a surface area of 13 m.²/gm. was then oxidized in the same manner described in Example 1. The surface area of the PdO was 7.6 m.²/gm., which was considerably less than the PdO of Example 1. The resultant pigment was combined with the same type vehicle described in Example 1, and the resultant paste subjected to a multiplicity of passes through a three roll mill. Periodically during the milling, samples were removed from the composition, printed on a substrate, fired, and the resultant temperature coefficient of resistance and resistivity recorded and plotted. The correlation between the number of passes and temperature coefficient of resistance is shown as curve 74 on FIG. 4 of the drawings. The correlation between resistance and number of passes is shown as curve 76. A comparison of FIG. 3 and FIG. 4, setting forth correlations between resistor paste composition having the same general pigments and vehicles, differing only in the particle size of the palladium oxide component of the pigment, indicates that the relationships are not linear and cannot be theoretically predicted. In FIG. 3 both the TCR curve and the resistivity curve appear as smooth curves. In comparison, the TCR curve 74 in FIG. 4 is a smooth curve that is displaced from curve 72, and that the resistance curve 76 indicates on FIG. 4 an optimum resistance value and thereafter a steady decrease in the resistivity with the number of passes through the rolling mill. The surface area of the palladium oxide in the pigment in Example 1 was 13 m.²/gm., whereas the surface area of the palladium oxide in the pigment in the composition of Example 2 was 7.6 m.²/gm. The process of fabricating a metal conductor of a pigment in the manner described in Examples 1 and 2, is described and claimed in U.S. application Ser. No. 388,459, entitled "Electrical Conductor Material and Method of Making Same," filed Aug. 10, 1964.

Example 3

An indium oxide-antimony oxide resistor composition was prepared utilizing a pigment having the following:

| | Parts by weight |
|---|---|
| $Sb_2O_5$ | 1.4 |
| $In_2O_3$ | 58.6 |
| Glass | 40 |

The glass in the above-described pigment contained the following:

| | Parts by weight |
|---|---|
| $Al_2O_3$ | 9.5 |
| $SiO_2$ | 49.4 |
| $B_2O_3$ | 10.4 |
| $As_2O_3$ | 0.4 |
| BaO | 30.3 |

Figure 5:
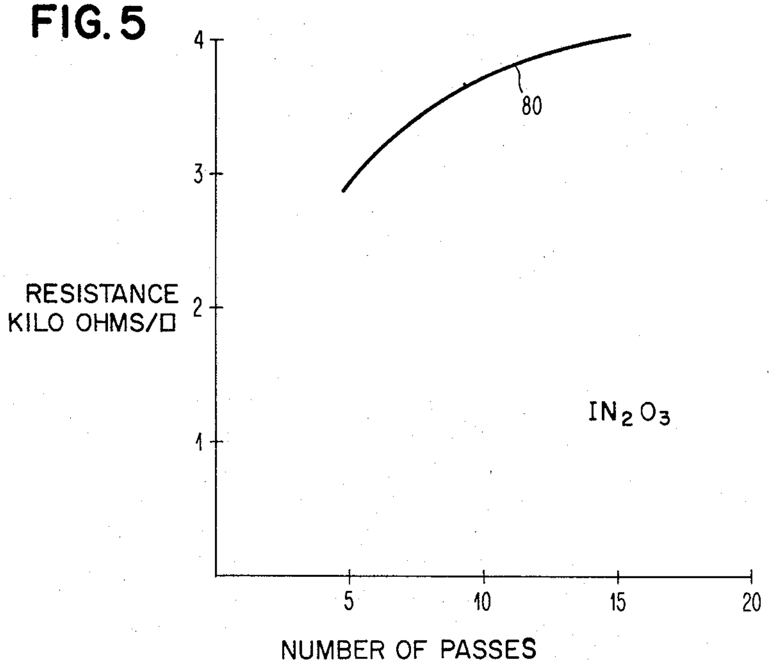
FIG. 5 is a graph of resistance versus number of passes which graphically depicits the results obtained in Example 3.

The components of the above-described pigment were thoroughly mixed and combined with the vehicle in the manner described in Example 1. The resultant paste was composed of 80 parts by weight of the pigment to 20 parts by weight of the vehicle. The resistor paste was then milled in a three roll mill for 15 passes, and samples taken periodically during the milling. The samples were printed to form resistors, fired, the resistors tested, and the results plotted in basically the same manner as described in Examples 1 and 2. The correlation between the number of milling passes and the resistance is graphically shown as curve 80 in FIG. 5 of the drawings. This curve can be used to accurately condition the resistor paste to a desired resistance. Example 3 again illustrates that the milling of a paste is a significant parameter that can be predicted and controlled by the method of this invention.

Example 4

Figure 6:
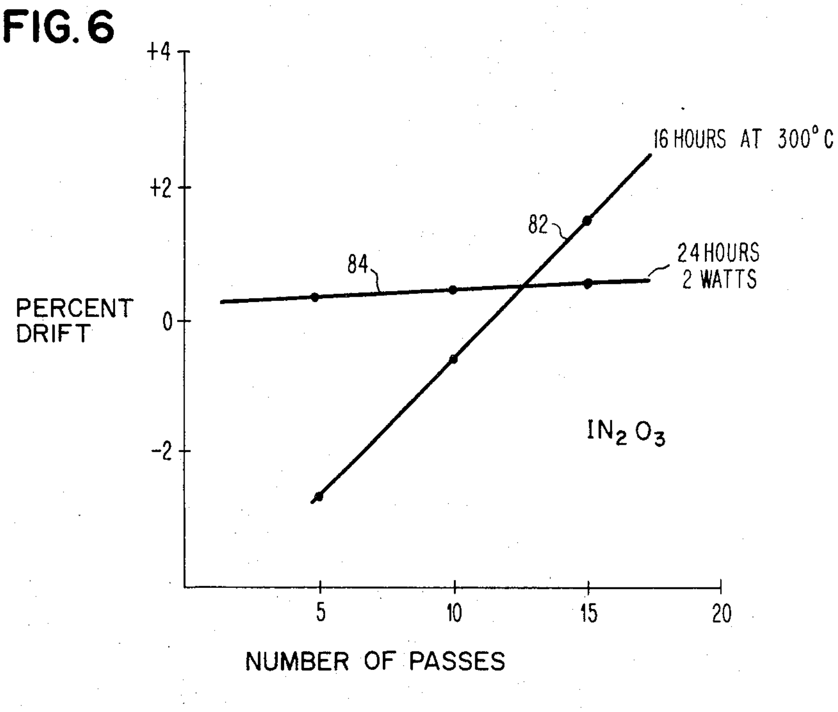
FIG. 6 is a graph of percent drift versus the number of passes which graphically depicits the results of Example 4.

In order to determine and illustrate that other related electrical properties of resistor compositions are influenced by the milling parameter, additional resistors were printed from each of the samples taken periodically during the milling operation from the composition described in Example 3. The resistance of each of the samples was measured and recorded initially. The samples were then subjected to environments which would cause drift. A first set of resistors taken from the composition at various stages of the milling was subjected to an environment maintained at a temperature of 300° C. for 16 hours. The resistances of the resistors were again measured and the percent drift calculated and recorded. This correlation between number of passes and drift is shown graphically by curve 82 in FIG. 6 of the drawings. The initial resistances of another similar set of resistors were measured and two watts of power was subsequently applied for 24 hours. At the end of the 24 hour period the resistances of the various resistors were again measured and the current drift calculated and recorded. This correlation of number of passes versus percent current drift is graphically shown as curve 84 on FIG. 6 of the drawings.

It can be seen that a well defined correlation resulted when percent drift was plotted versus number of passes for the particular resistor composition. With information of this type it is possible to condition resistor pastes by milling to better withstand and remain stable in the environment that the resistors produced therefrom will be subjected to in use.

While the invention has been particularly shown and described with reference to preferred embodiments thereof, it will be understood by those skilled in the art that various changes in form and detail may be made therein without departing from the spirit and scope of the invention.

What is claimed is:

1. A method of preparing and controlling the electrical properties of a resistor composition for making fired resistors comprising:
forming a homogeneous raw paste having 50 to 83 percent by weight of a solids mixture and 17 to 50 percent by weight of an inert liquid vehicle,
said solids mixture including 10 to 28 percent by weight of silver, and 14 to 32 percent by weight of palladium,
said inert vehicle including 20 to 80 percent by weight of a linear polymer resin, 20 to 80 percent by weight of a hydrocarbon solvent,
subjecting a portion of said raw paste to a multiplicity of passes through a three roll mill having the rollers thereof biased toward each other under a constant pressure sufficient to assure an operative milling engagement while periodically forming and firing resistor elements from said resultant milled paste taken at various milling passes,
measuring the electrical resistance of the resultant resistor elements,
preparing a correlation between the resistance properties and the number of passes of the roll mill,
determining from said correlation the number of passes necessary to condition the remainder of said paste to a desired electrical resistance,
and milling said paste the required number of passes.

2. A method of preparing and conditioning a resistor composition for making resistors comprising of:
forming a homogeneous raw paste having 50 to 82 percent by weight of a solids mixture, 17 to 50 percent by weight of an inert liquid vehicle,
subjecting a sample of said raw paste to a multiplicity of passes through a roll mill having the rollers thereof biased together under a constant pressure sufficient to assure an operative milling engagement, while
periodically forming resistors from said resultant milled paste taken at various milling passes,
preparing a correlation between the resistance properties of the milled paste and the number of passes through the roll mill,
determining from said correlation the number of passes necessary to condition said paste composition to a desired electrical resistance,
and milling said paste the required number of passes.

3. The method of claim 2 wherein said paste is milled a number of passes less than the number of passes determined from said correlation:
a resistor is prepared from the resultant paste and the electrical resistance measured, said correlation used to determine the exact additional number of milling passes necessary to condition the paste to the exact electrical resistance desired,
and milling said paste the indicated number of additional passes.

4. A method of preparing and conditioning a resistor composition comprising:
subjecting at least a portion of a raw paste comprising an electrically conductive pigment and an inert liquid vehicle to a multiplicity of passes through a roll mill having the rollers thereof biased together in operative milling engagement, while
periodically forming resistors from said resultant milled paste taken at various milling passes,
measuring the electrical characteristics of the resistors and preparing a correlation between said electrical characteristics and the number of passes through the rolling mill,
determining from said correlation the number of passes necessary to condition said paste composition to the desired electrical characteristic,
and milling said paste the required number of passes.

5. A method of preparing and conditioning a resistor composition for making resistors comprised of:
forming a homogeneous raw paste by combining and mixing an electrically conductive pigment and an inert liquid vehicle,
subjecting at least a portion of said raw paste to a multiplicity of passes through a roll mill having the rollers biased into an operative milling engagement, while
periodically forming resistors from said resultant milled paste taken at various milling passes,
measuring the temperature coefficient of resistance characteristics of the resultant resistors and preparing a correlation between same and the number of passes through the roll mill,
determining from said correlation the number of passes necessary to condition the paste composition to the desired temperature coefficient of resistance characteristic, and
milling the said paste the required number of passes.

References Cited

UNITED STATES PATENTS

| | | | |
|---|---|---|---|
| 1,771,236 | 7/1930 | Schellenger | 338—195 |
| 1,962,438 | 6/1934 | Flanzer | 338—195 |
| 2,950,995 | 8/1960 | Place, et al. | 29—620 |
| 3,052,573 | 9/1962 | Dumesnil | 117—221 |
| 3,277,020 | 10/1966 | Janakirama-Rao | 252—514 |

ROBERT F. WHITE, *Primary Examiner.*

G. AUVILLE, *Assistant Examiner.*